United States Patent Office 3,654,200
Patented Apr. 4, 1972

3,654,200
DIMETHYLOLAMIDE MODIFIED BARK ALKALI PRODUCT AND METHOD OF MAKING SAME
Tsong-Han Hsu, Brewster, N.Y., assignor to U.S. Plywood-Champion Papers Inc., Hamilton, Ohio
No Drawing. Filed July 9, 1970, Ser. No. 53,650
Int. Cl. C08b 15/06; C08g 51/18
U.S. Cl. 260—17.2
19 Claims

ABSTRACT OF THE DISCLOSURE

A bark alkali product made from whole bark is modified with dimethylolurea to make a thermosettable resin useful as a plywood adhesive in a method wherein coniferous tree bark is comminuted, then cooked at 90–100° C. in an aqueous sodium hydroxide solution until a predetermined formaldehyde reactivity is reached thus yielding a liquid bark alkali. The liquid bark alkali, which contains the whole bark constituents without separating into selected fractions is then modified or reacted with a dimethylolamide of a dibasic acid such as dimethylolurea at 60–75° C. to produce the modified alkali bark product of the invention which is useful as a plywood adhesive, has water resistance, can be used as a direct substitute for phenol-formaldehyde up to about 65% in adhesive formulae, and can be fused or cured by exposing the product or plywood layers containing it to sufficient heat.

BACKGROUND OF THE INVENTION

This invention relates to a modified alkali bark product and a method of making same. One aspect of the invention relates to making a modified bark alkali product and using it as a plywood adhesive. A specific aspect of the invention relates to modifying the liquid bark alkali made by cooking whole bark in aqueous sodium hydroxide by adding, at the end of the cook, a dimethylolamide of a dicarboxylic acid preferably dimethylolurea in connection with which it will be described it being understood that equivalents are included.

It is known to make resins and resin based adhesives from tree bark by cooking (i.e., adding heat to) the bark in an aqueous alkaline (i.e., caustic) environment. The product recovered from such cooking may be mixed with phenol-formaldehyde resins of either the resol or novolak variety and used as an adhesive or for other purposes such as molding resins. Herrick et al. U.S. Pat. 3,025,250 is representative of this category of art.

Products obtained by such bark—caustic reaction are often called "alkali bark." These alkali barks exhibit poor water resistance and in fact their usefulness is limited because of the amount of water they take up. The alkali barks are as a general rule thermosetting, but even when fused or thermoset still exhibit this affinity or lack of resistance to water.

Accordingly, various attempts have been made to improve the water resistance of such alkali barks. One alternative has involved acidifying the alkali bark or a selected fraction thereof. Blickensderfer et al. discloses one manner of doing this to fused alkali bark in U.S. Pat. 3,371,054.

Another approach has been to recover the insoluble materials after treating bark with caustic and to use the insolubles. U.S. Pat. 3,328,322 teaches doing this with Douglas fir bark, acidifying the insoluble fraction and then adding urea-formaldehyde to that fraction.

Urea-formaldehyde reaction products have been generally known in the art as exhibiting poor water resistance. Cured urea-formaldehyde resins are well known to have poor water resistance. This feature is commented on at length in representative U.S Pats. 3,076,780 and 3,404,198 which are concerned with phenol-formaldehyde-urea binder compositions. In particular, these teach the use of dimethylolurea (the reaction product of urea and formaldehyde) derivatives combined with phenol-formaldehyde resins to provide a product having improved water resistance compared with phenol-formaldehyde-urea systems.

The present invention involves a system where the alkali bark product is modified by combining or treating it with an amide of a dicarboxylic acid preferably a dimethylolamide of a dibasic acid even more preferably dimethylolurea or an equivalent thereof. Surprisingly, even though the constituent parts are considered by the art to have poor water resistance, when combined with each other in the manner described herein just the opposite occurs: enhanced water resistance results from combining these ingredients. The product is useful as a molding resin and is particularly useful in adhesives of the sort employed to laminate or glue together plywood layers.

Accordingly, an object of the present invention is to make an improved resin product from bark. Another object of the invention is to make from whole bark that has been treated with alkaline materials but which has been neither acidified nor separated into selected fractions, a product having an improved water resistance. A further object of the invention is to make an adhesive resin product having improved water resistance out of bark treated with an alkaline material.

SUMMARY OF THE INVENTION

A general understanding of the present invention may be obtained from the following flow sheet:

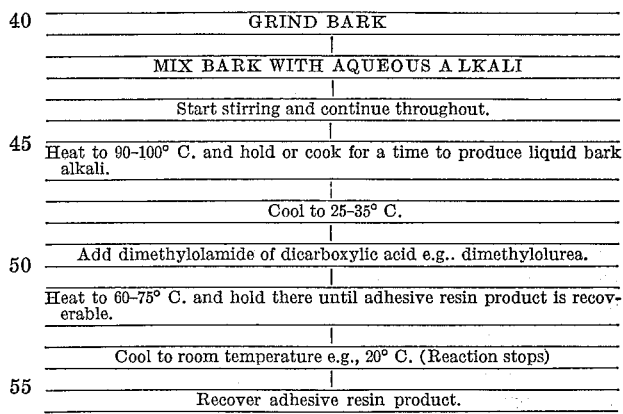

Thus, as can be seen from viewing the above flow sheet, the method according to my invention comprises the steps of reacting or cooking finely ground bark with alkaline material in an aqueous system at a temperature in the range of about 90–100° C. and for a time sufficient to substantially react the bark and alkaline material to produce a liquid bark alkali. Modification of the liquid bark alkali is then carried out by adding to it a dimethylolamide of a dicarboxylic acid e.g., dimethylolurea which is the reaction product of formaldehyde and urea. The modification reaction is conducted at 60–75° C. for a time sufficient to form a thermosettable resin having a total solids in the range from about 33 to 45% on a weight basis and a water solubility in the range from about 50% to about 85% on a weight basis.

DETAILED DESCRIPTION OF THE INVENTION

Bark used in the present invention is preferably a coniferous tree bark and most preferably a Douglas fir tree bark. Actually, most wood yards will produce a mixture of barks and one would normally expect to find various barks mixed in various proportions. In regions where Douglas fir is produced, the bark mixture would probably include white fir bark as well as other barks.

The bark in its ordinary natural state has about 14% by weight water. All of the bark is employed in the present process. It is not divided into fractions with one fraction being treated and the other one devoted to other uses or disposed of, except for such particles as fail to pass a screen, knots, etc. The bark I use for this invention is called whole bark.

In preparing the bark, it is converted into finely divided form by using various types of conventional paper mill equipment such as hammer mills, attritors, and the like. It is preferred to reduce the whole bark to where it will pass a 100 mesh screen. The finely ground bark (i.e., that which has passed a 100 mesh screen) is used in the process.

The finely ground whole bark is added with agitation to a hot (40–60° C.) aqueous alkali solution. Sodium hydroxide is preferred as the alkaline material but the invention contemplates that these other alkaline compounds can be used: KOH, CaO or $Ca(OH)_2$, $NH_4OH$, $Na_2S$, and $(NH_4)_2S$, mixtures thereof or mixtures of chemicals that would produce one or more of these in situ. In defining the invention the terms "$Na_2O$ equivalent" or "alkaline compound calculated as $Na_2O$" are used which means the amount of the foregoing alkaline compounds equivalent to $Na_2O$ as such.

The aqueous alkali solution preferably is from about 10 to 15% by weight of NaOH which is from about 8% to about 12% of alkaline compound calculated as $Na_2O$. The alkali solution may, however, contain on a weight basis from about 8% to about 25% alkaline compound calculated as $Na_2O$.

Constant agitation is important during all states of preparation. It should be done during the addition of reagents, during the various heating and cooling steps, and continued until the final product is obtained. Agitation is being performed at all times in the descriptions herein unless expressly excluded.

The finely ground bark is added slowly to the alkaline solution while constantly stirring at temperature 40–60° C. The bark is preferably added in small batches (if so, each batch is thoroughly stirred in before adding the next batch). The reaction between the bark and the alkaline solution is exothermic and raises the bark-alkaline solution temperature to above 65° C. About 100 parts of dry whole bark fines (i.e., whole bark which has passed a 100 mesh screen and has no water added but does contain a natural amount of water—about 14% by weight) is added to each 100 to 300 parts of aqueous sodium hydroxide of the 10–15% strength, all parts by weight. More broadly, about 100 parts of bark is added to each 100 to 300 parts of aqueous alkali solution which contains about 8 to about 25 parts by weight of alkaline compound calculated as $Na_2O$.

After all of the bark is charged and mixed with the solution, heat is added to the entire mixture sufficient to raise the temperature from about 90° C. to about 100° C Heating should be at a modest rate and should avoid forming a foam: too rapid heating foams.

The cooking step follows immediately: in this step the temperature is held at 90–100° C. for a time sufficient to substantially react the bark with the alkaline solution. About 1 to 5 hours, preferably about 3 hours, is sufficient time. Substantial reaction, or the length of time for the cooking step, is when a predetermined formaldehyde reactivity is reached, as determined by any acceptable test. Formaldehyde reactivity as used herein is determined by the test method described in "Formaldehyde," by J. F. Walker, Reinhold Publishing Corp., New York, 1944, pp. 256–266. The formaldehyde reactivity as determined by this method (which is a hydroxyl-amine hydrochloride test method of Brochet and Cambier at page 263) should be at least 0.08 part of formaldehyde per part by weight of the cooking product and preferably should be in the range from 8 to 18 parts of formaldehyde per 100 parts of cooking product on a dry weight basis (i.e., from 8% to 18%). The cooking product at this point contains on a dry weight basis from about 50 to about 85 percent by weight of water soluble material. The finished cooking product is a dark colored liquid having the aforesaid formaldehyde reactivity and an amount of water soluble material and I call it a liquid bark alkali.

In practice, time is the easiest manner of determining when the liquid bark alkali is produced. The time is determined from experience with a given bark, solution strength, and cooking temperature for producing liquid bark alkali with specified properties such as formaldehyde reactivity and amount of water soluble material. My experience with Douglas fir bark leads to preferment of about 3 hours of cooking to produce liquid bark alkali with properties as aforesaid.

Cooking is stopped by cutting off the heat and cooling the liquid bark alkali to below about 35° C. Agitation as by stirring continues during this cooling phase. Cooling must go to 35° C. or lower (below about 35° C.) because the dimethylolamide of a dibasic acid e.g., dimethylolurea will react too fast if a higher temperature prevails. While cooling may be to a temperature below about 25° C., I have found no appreciable difference in reaction rate, product obtained, or other factors in going below about 25° C. Thus, cooking is stopped by cooling to below about 35° C. or, preferably, to in the range from about 25° C. to about 35° C.

The next thing is to form a pre-resinous system by adding the modifier (which is preferably dimethylolurea but may be its equivalent) to the 25–35° C. liquid bark alkali while stirring. The modifier is preferably a dimethylolamide of a dicarboxylic acid, or more generally a mono- and multi-methylol dibasic amide, more preferably a mono- or di- or tri- or tetra-methylol dibasic amide or an amide of a dibasic acid selected from the class consisting of dimethylolurea, dimethyloloxamide, dimethylolmalonamides, dimethylolsuccinamide, dimethylolglutaramide, dimethyloladipamide, dimethyloltereph-thalamide, methylolmelamines of the general formula $C_3N_6H_m(CH_2OH)_n$ wherein $m+n=6$, dimethylolethyl-eneurea, dimethylolmethylene bis-urea, dimethylolethyl-ene bis-urea, dimethylolpropylene bis-urea, dimethylol-thiourea, methylolurethanes of the formula $$ROCONHCH_2OH$$

wherein R is an alkyl, and methylolhydantoins of the formula

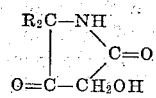

wherein R is hydrogen or an alkyl, or a mixture of any of the foregoing amides, and most preferably is dimethylolurea.

The dimethylolurea modifier (which is solid) is added at a ratio of about 4% to about 15% by weight based on the dry bark fines and calculated as dimethylolurea. The dimethylolurea is easily made by reacting formaldehyde and urea at the mole ratio or 2.1 to 1.0 at 18–25° C. for 15 hours. (Ind. & Eng. Chem. vol. 31, No. 6, June 1939, p. 676.) Preferably, the modifier is added to the bark alkali in small batches with thorough stirring in order to promote homogeneity and maintain control of the system which it reacts.

After all of the modifier is added, the pre-resinous system is heated and slowly brought to a temperature in the range from about 60° C. to about 75° C. and held at such temperature for a time sufficient to form a resin having a total solids in the range from about 33 to 45% on a weight basis. The time should be in the range from 10–60 minutes. The resin at ordinary condition, i.e., 25° C. and 1 atmosphere has a water solubility in the range from about 50% to about 85% on a weight basis.

The reaction of the pre-resinous system is stopped at the end of said time by cutting off the heat and cooling the system to or below a temperature level at which no significant further reaction takes place. Twenty degrees centigrade (i.e., about normal room temperature) is such a temperature, and provides a shelf life of about three weeks which is suitable for most purposes. A lower temperature extends the shelf life and a higher temperature tends to shorten the shelf life. The product, an adhesive resin, exists at this point. It is a dark brown to black pasty material that is thermosettable.

The paste adhesive resin product can be used as a direct substitute for phenol-formaldehyde resin in adhesive formulae, especially for plywood adhesives as set forth in some of the examples.

The adhesive resin product also has an alkaline pH, generally in the range from 10.5 to 12.1. If said product is heated at 285° F.–310° F. for 30–60 minutes it becomes insoluble in water and also is infusible. Its water resistance is especially enhanced when compared to liquid bark alkali which has been reacted with formaldehyde, heated and solidified. Note that the adhesive resin product does not require an additional aldehyde donor to achieve these properties.

The following examples illustrate practice and features of the invention (all parts are by weight unless otherwise stated in the examples and in the specification and claims):

EXAMPLE I

Western coniferous tree bark, consisting chiefly of bark of Douglas fir and white fir was hogged in a hammermill to a size which could be fed to a commercially available refiner or attrition mill. The attrition mill product was separated using a metal disk screen having about 100 meshes to the inch. The fine material passing the screen was collected.

A kettle equipped with mechanical agitator, thermometer, and reflux condenser was charged with a quantity of 150 parts of 10–15% by weight aqueous solution of sodium hydroxide. 100 parts of the bark fines were added in small portions to the hot aqueous solution of sodium hydroxide in the kettle with agitation to form a smooth slurry. The kettle was heated to 98° C. with continuous stirring and held at 98–100° C. for 3 hours. The reaction mixture was then cooled with agitation to 30° C. At this stage the batch of reaction mixture, herein called liquid bark alkali, was immediately modified by reacting with dimethylolurea as described in each of the following examples: a separate batch of liquid bark alkali was prepared in this manner for each of Examples II–V.

EXAMPLE II

To the batch of liquid bark alkali made in Example I, 6 parts of dimethylolurea was added in small amounts with continuous agitation to form a smooth suspension. The kettle was heated slowly with continuous stirring to the temperature of about 65° C. and held at that temperature for a reaction time of 25–30 minutes. The reaction mixture was then quickly cooled to approximately 20° C. At this stage the reaction mixture, called the dimethylolurea modified bark alkali product of this invention, can be used as a substitute or supplement for phenol-formaldehyde resin in an exterior grade glue mixture for plywood and hardboard.

EXAMPLE III

A batch of liquid bark alkali was made according to Example I, to which was added 8 parts of dimethylolurea following the procedure used in Example II. The reaction time was decreased from 25–30 minutes to 20–45 minutes.

EXAMPLE IV

Using the procedure of Example II, 10 parts of dimethylolurea were added to a batch of liquid bark alkali made per Example I and the reaction time was reduced to 15–20 minutes.

EXAMPLE V

Using the Example II procedure, 4 parts of dimethylolurea were added to a batch of liquid bark alkail made in accordance with Example I and the reaction time of 40–50 minutes was realized.

EXAMPLE VI

A glue mixture for exterior plywood was prepared by mixture 37.14 parts of the dimethylolurea modified bark alkali product of Example II, 37.14 parts of phenol formaldehyde resin (40% Monsanto PF–535), 5.29 parts of extender, 5.57 parts caustic soda and soda ash, and 14.87 parts of water.

This glue mixture, having a good working viscosity, readily wetted the spreader rolls so that a glue line film could be applied to veneers at rates customary in the Douglas fir plywood industry. Each face of veneer core was coated with the glue mixture in the range of 60–70 lbs. per 1000 square foot. Suitable working life of the glue mixture was noted through a spreading operation extending over about 3 hours without significant increase in viscosity.

The veneers were assembled into 3-ply panels and hot pressed at 290–300° F. and 175–185 p.s.i. for 5–7 minutes.

The resulting plywood was subjected to the standard test methods for exterior type plywood as described in American Plwood Association U.S. Product Standard PSI–66 (Nov. 1, 1966) and compared to the requirements thereof for exterior type plywood in par. 3.6.3. The average dry shear was 239.4 p.s.i., wood failure 89.4% and average wet shear 178.1 p.s.i., wood failure 89.4% average of 100 test specimens). This meets the requirements for exterior type plywood.

EXAMPLE VII

Similarly, a nearly identical glue mixture was formulated, except that the dimethylolurea modified bark alkali product of Example III containing 8 parts of dimethylolurea was used in the glue mixture instead of that of Example II containing 6 parts of dimethylolurea. The resulting plywood, tested in the same way as in Example VI, gave a dry shear of 241.5 p.s.i., wood failure 99.11% and wet shear of 176.9 p.s.i., wood failure 90–6% (average of 125 test specimens). These values meet the requirements for exterior type plywood.

EXAMPLE VIII

Similarly a glue mixture was formulated almost identical to glue mixture No. 1 except that the dimethylolurea modified bark alkali product of Example IV containing 10 parts of dimethylolurea was used in the glue mixture instead of that of Example II containing 6 parts of dimethylolurea. The resulting plywood, tested under the same methods as in Example VI, gave a dry shear of 202.5 p.s.i., wood failure 89.6%, and a wet shear of 157.8 p.s.i., wood failure 85.4% (average of 100 test specimens). These results meet the requirements for exterior type plywood.

EXAMPLE IX

Similarly a glue mixture was formulated, nearly identical with the glue mixture No. 1 of Example VI, except that the dimethylolurea modified bark alkali product of Example V containing 4 parts of dimethylolurea was used in the glue mixture instead of that of Example II containing 6 parts of dimethylolurea. The resulting plywood under the same test methods as in Example VI gave a dry shear of 212.3 p.s.i., wood failure 92.5% and wet shear of 126.3 p.s.i., wood failure 82.5% (average of 100 test specimens). These results fail to meet the requirements for exterior type plywood.

EXAMPLE X

Similarly a glue mixture (control) was formulated nearly identical with the glue mixture No. 1 of Example VII, except that the reaction mixture of Example I containing no dimethylolurea was used. The resulting plywood gave a dry shear of 190.6 p.s.i., wood failure 75.6%, and wet shear of 98.7 p.s.i., wood failure 58.2% (average of 100 test specimens). These results fail the requirements for exterior type plywood.

The product recovered by modifying liquid bark alkali with an amide of a dibasic acid preferably a dimethylolamide of a dibasic acid, e.g., dimethylolurea or a chemical equivalent thereof has a total solids in the range from 33 to 45% on a weight basis.

The modified product recovered can be used as a direct substitute for phenol-formadehyde resins up to about 65% by weight of the total mixture and on a one-for-one basis. Preferably the product made by the present invention is combined with a resol type of phenol formaldehyde resin which is ordinarily in liquid form and thus convenient to add to the paste sort of product produced by the instant invention.

The reaction vessel or kettle should be opened to the atmosphere and jacketed to admit steam for heat and water for cooling. A mechanical stirrer should also be supported within the container.

The invention claimed is:

1. A method of producing an adhesive from tree bark comprising the steps of
   reacting bark with an alkali metal hydroxide in an aqueous system open to the atmosphere at a temperature not above 100° C. for a time sufficient to substantially react the bark and hydroxide to produce a liquid bark alkali; and
   mixing said liquid bark alkali with a dimethylolamide of a dicarboxylic acid, the ratio of said dimethylolamide to bark being in the range from about 0.04:1 to about 0.15:1 on a weight basis.

2. A method according to claim 1 wherein said dimethylolamide consists essentially of dimethylolurea.

3. A method according to claim 1 wherein said mixing is done at a temperature less than about 35° C.

4. A method according to claim 1 wherein said mixing is done at a temperature in the range from about 25° C. to about 35° C.

5. A method according to claim 1 wherein said mixing step includes heating said bark alkali and said dimethylolamide to a temperature between about 35° C. and 100° C. for a time sufficient to substantially react them.

6. A method according to claim 1 wherein said mixing step includes heating said bark alkali and said dimethylolamide to a temperature between about 60° C. to about 75° C.

7. A method according to claim 5 wherein said reacting time and said heating time are for a time interval in the range from about 10 minutes to about 5 hours.

8. A method according to claim 1 wherein the ratio of bark to alkali metal hydroxide calculated as $Na_2O$ is from about 1:0.08 to about 1:0.25.

9. A method according to claim 1 wherein the bark is coniferous bark.

10. A product of said liquid bark alkali of the method of claim 1 having a total solids in the range from 33–45% and a formaldehyde reactivity in the range from about 8 to about 18 percent by weight.

11. A modified bark alkali resin having a formaldehyde reactivity in the range from about 8% to about 18% comprising the reaction product of
    (a) the liquid bark alkali produced by reacting bark with an alkali metal hydroxide in an aqueous system open to the atmosphere at a temperature from about 90° C. to not above about 100° C. for a time sufficient to substantially react the bark and hydroxide to produce a liquid bark alkali; and
    (b) an amide of a dicarboxylic acid, the ratio of said amide to bark being in the range from about 0.04:1 to about 0.15:1 on a weight basis.

12. A resin according to claim 11 wherein the bark is coniferous.

13. A resin according to claim 11 having a water solubility in the range from about 50 to about 85%.

14. An adhesive composition comprising a mixture of resol type phenolic resin; and
    the reaction product of dimethylolurea and the liquid bark alkali resulting from reacting bark with an alkali metal hydroxide in an aqueous system open to the atmosphere at a temperature not above 100° C. for a time of about 1–5 hours sufficient to substantially react the bark and hydroxide to produce a liquid bark alkali; the ratio of said dimethylolurea to bark being in the range from about 0.04:1 to about 0.15:1 on a weight basis, and on a weight basis there being at least about 35% resol type phenolic resin and not more than about 65% of said reaction product and the composition has a total solids of from about 33 to 45%.

15. A method of making a water resistant alkaline resin comprising the steps of
    comminuting coniferous bark to make a bark powder;
    mixing said bark powder with an aqueous solution of sodium hydroxide;
    heating the mixture of bark powder and sodium hydroxide to a temperature in the range from 90–100° C. at a rate slow enough to avoid foaming and holding the mixture in such range for a time of about 1–5 hours sufficient to substantially react the materials in the mixture;
    cooling the mixture, after said holding, to a temperature less than about 35° C.;
    mixing the reaction product of an aldehyde donor and urea and the cooled mixture to form a pre-resinous system, the ratio of said reaction product to bark being in the range from about 0.04:1 to 0.15:1 on a weight basis; and
    heating the pre-resinous system to a temperature in the range from about 60° C. to about 75° C. for a time of about 10–60 minutes sufficient to form a resin having a total solids in the range from about 33 to 45%, and a water solubility in the range from about 50 to 85%.

16. A method according to claim 15 further comprising stirring during all steps from the first step of mixing through the last step of heating.

17. A method according to claim 15 wherein said bark is whole bark.

18. A method of producing an adhesive from tree bark comprising the steps of
    reacting bark with an alkali metal hydroxide in an aqueous system open to the atmosphere at a temperature from about 90° C. to about 100° C. for a time of about 1–5 hours that is sufficient to substantially react the bark and hydroxide to produce a liquid bark alkali; and
    mixing said bark alkali with an active cross-linking reagent that contains a methylol (or hydroxymethyl)

group or groups bonded to the nitrogen of the molecule of an amide of a dicarboxylic acid, the ratio of said reagent to bark being in the range from about 0.04:1 to about 0.15:1 on a weight basis.

19. A method of producing an adhesive from tree bark comprising the steps of reacting bark with an alkali metal hydroxide in an aqueous system open to the atmosphere at a temperature in the range from about 90° C. to about 100° C. for a time of about 1–5 hours sufficient to substantially react the bark and hydroxide to produce a liquid bark alkali; and mixing said liquid bark alkali with a reagent selected from the class consisting of dimethylolurea, dimethyloloxamide, dimethylolmalonamides, dimethylolsuccinamide, dimethylolglutaramide, dimethyloladipamide, dimethylolterephthalamide, methylolmelamines, dimethylolethyleneurea, dimethylolymethylene bis-urea, dimethylolethylene bis-urea, dimethylolpropylene bis-urea, dimethylothiourea, methylolurethanes, and methylolhydantoins, and mixtures thereof, the ratio of said reagent to bark being in the range from about 0.04:1 to about 0.15:1 on a weight basis.

References Cited

UNITED STATES PATENTS

| | | | |
|---|---|---|---|
| 2,926,146 | 2/1960 | McCully | 260—9 |
| 2,930,772 | 3/1960 | Williams et al. | 260—17.2 |
| 3,328,322 | 6/1967 | Kreibich et al. | 260—17.2 |
| 3,518,210 | 6/1970 | Edelstein et al. | 260—17.2 |

WILLIAM H. SHORT, Primary Examiner

E. WOODBERRY, Assistant Examiner

U.S. Cl. X.R.

162—166; 260—209 R, 17.3